United States Patent
Cluzel

(12) 
(10) Patent No.: US 6,470,939 B1
(45) Date of Patent: Oct. 29, 2002

(54) RADIAL TIRE WITH CROWN REINFORCEMENT INCLUDING RADIAL PLY

(75) Inventor: Guy Cluzel, Beaumont (FR)

(73) Assignee: Campagnie Generale des Etablissements Michelin - Michelin & Cie, Clarmont-Ferrand (FR)

(*) Notice: Subject to any disclaimer, the term of this patent is extended or adjusted under 35 U.S.C. 154(b) by 14 days.

(21) Appl. No.: 09/708,889

(22) Filed: Nov. 8, 2000

Related U.S. Application Data

(63) Continuation of application No. PCT/EP99/02740, filed on Apr. 23, 1999.

(30) Foreign Application Priority Data

May 11, 1998 (FR) .............................................. 98 05999

(51) Int. Cl.$^7$ .............................. B60C 9/18; B60C 9/20
(52) U.S. Cl. ........................ 152/532; 152/534; 152/535
(58) Field of Search .................................. 152/534, 535, 152/532

(56) References Cited

U.S. PATENT DOCUMENTS

| | | | |
|---|---|---|---|
| 3,118,483 A | 1/1964 | Beckadolph | |
| 3,131,744 A | 5/1964 | Boussu et al. | |
| 4,271,890 A | 6/1981 | Pommier | |
| 4,696,335 A | 9/1987 | Tsukagoshi et al. | |
| 5,662,752 A | 9/1997 | Nakano | |
| 5,738,740 A | 4/1998 | Cluzel | |
| 5,772,810 A | 6/1998 | Cluzel | |
| 6,401,778 B1 * | 6/2002 | Cluzel | 152/535 X |

FOREIGN PATENT DOCUMENTS

| | | |
|---|---|---|
| WO | 9924269 | 5/1999 |

OTHER PUBLICATIONS

Patent Abstracts of Japan, vol. 097, No. 011, Nov. 28, 1997, Publication No. 09175109, Application 07335403 of Matsumoto Hiroyuki, Bridgestone Corp, Jul. 8, 1997.
Patent Abstracts of Japan, vol. 017, No. 694 (M–1531) Dec. 17, 1993, Publication No. 05238206, Application 04043727 of Horiuchi Mamoru, Bridgestone Corp, Sep. 17, 1993.

* cited by examiner

*Primary Examiner*—Adrienne C. Johnstone
(74) *Attorney, Agent, or Firm*—Baker Botts L.L.P.

(57) ABSTRACT

A tire with a radial carcass reinforcement of maximum axial width $S_0$, including a crown reinforcement formed of at least two working crown plies of inextensible reinforcement elements, crossed from one ply to the other, forming angles of between 10° and 45° with the circumferential direction, the plies having axial widths greater than the width of an additional ply of inextensible, substantially radial, metallic reinforcement elements. The additional ply is arranged radially between the working plies, the working plies being, on either side of the equatorial plane and in the immediate axial extension of the additional ply, coupled over an axial distance at least equal to 3.5% of the width $S_0$, then being decoupled by profiled members of rubber mix at least over the remainder of the width common to the two working plies.

13 Claims, 2 Drawing Sheets

RADIAL TIRE WITH CROWN REINFORCEMENT INCLUDING RADIAL PLY

This is a continuation of PCT/EP99/02740, filed Apr. 23, 1999.

BACKGROUND OF INVENTION

The present invention relates to a tire with radial carcass reinforcement anchored on either side to at least one bead wire and having a crown reinforcement formed of at least two so-called working plies, superposed and made of wires or cables which are parallel in each ply and are crossed from one ply to the next, forming angles of at most 45° in absolute value with the circumferential direction of the tire.

It relates more particularly to a tire of the "heavy vehicle" type, the ratio of the height above rim H to the maximum axial width S of which is at most 0.80, and which is intended to be fitted on a medium- or high-tonnage vehicle, such as a lorry, bus, trailer, etc.

Some current tires, called "highway" tires, are intended to travel at high speed and on longer and longer journeys, owing to the improvement in the road network and the growth of the motorway network throughout the world. All the conditions under which such a tire is required to travel without doubt make it possible to increase the number of kilometers traveled, the wear of the tire being less; on the other hand, the endurance of the latter and in particular of the crown reinforcement is adversely affected.

U.S. Pat. No. 4,271,890 discloses that although the type of tire in question, with a low H/S ratio, has numerous advantages, it also has a certain number of disadvantages, such as poor adhesion of the equatorial zone of the tread or localization of high pressures in the region of the edges of the tread, which pressures are due to the shortening of the area of contact in the longitudinal direction of the tire. In order to overcome said disadvantages, the cited Patent advocates arranging between the carcass reinforcement and the radially inner working ply, in two zones distant from the equatorial plane, two limiting blocks each formed of two superposed plies of inextensible cables, crossed from one ply to the other, forming opposed angles with the circumferential direction which are at most equal in absolute value to half the smallest angle used in the working plies, and other than 0°.

The application of the solution set forth above, and the application thereof to a tire of H/S form ratio of at most 0.80, in particular at most 0.60, intended to be fitted on a heavy vehicle, does not make it possible to obtain satisfactory endurance of the crown reinforcement. The lack of endurance relates both to the fatigue resistance of the crown plies, and in particular the resistance to separation between ends of plies, and to the fatigue resistance of the cables of the portion of carcass reinforcement located beneath the crown reinforcement, the first deficiency being greatly influenced by the operating temperature at the edges of the working plies, whether traveling in a straight line or under drift.

The object of U.S. Pat. No. 5,738,740 is to improve the endurance of the crown reinforcement of a "heavy vehicle" tire, of a form ratio of at most 0.60, said reinforcement comprising at least two working crown plies of inextensible cables, crossed from one ply to the next, forming angles of between 10° and 45° with the circumferential direction, said plies having widths at least equal to 80% of the maximum axial width $S_0$ of the carcass reinforcement. It proposes arranging, firstly between the carcass reinforcement and the working ply radially closest to the axis of rotation, an axially continuous ply formed of inextensible metal cables forming with the circumferential direction an angle of at least 60° and the axial width of which is at least equal to the axial width of the shortest working crown ply, and, secondly between the two working crown plies, an additional ply formed of metallic elements oriented substantially parallel to the circumferential direction, the axial width of said ply being at least 0.7 $S_0$, and the modulus of elasticity upon traction of which being at most equal to the modulus of the same name of the most extensible working ply.

Although the problems relating to the separation between working plies and the fatigue resistance of the carcass reinforcement cables would appear to be solved in one case, if the operating temperatures are greatly reduced in the other case, on the other hand prolonged travel of the tires thus constructed causes fatigue failure of the cables of the additional ply, and more particularly of the edges of said ply, whether or not the so-called triangulation ply is present.

It is always possible to change the reinforcement elements concerned, and in particular to select cables of a different construction or cables of greater tensile strength. The solution above, while admittedly simple, is still costly.

In order to overcome the above drawbacks and to improve the endurance of the crown reinforcement of the type of tire in question, U.S. Pat. No. 6,401,778 B1 has proposed a tire with radial carcass reinforcement of maximum axial width $S_0$, comprising a crown reinforcement formed of at least two working crown plies of inextensible reinforcement elements, crossed from one ply to the other, forming angles of between 10° and 45° with the circumferential direction, said plies having axial widths at least equal to 80% of the width $S_0$, and, arranged radially between said working plies, an additional ply of reinforcement elements substantially parallel to the circumferential direction, said working plies having widths greater than the width of the additional ply by at least 16% of the width $S_0$, and, on either side of the equatorial plane and in the immediate axial extension of the additional ply, being coupled over an axial distance at least equal to 3.5% of the width $S_0$, then being decoupled by profiled members of rubber mix at least over the remainder of the width common to said two working plies.

The choice of circumferential reinforcement elements for the additional ply of inextensible elements, such that the modulus of elasticity under traction of said additional ply is at most equal to the modulus of the same name of the most extensible working ply, and preferably low for a relative elongation of between 0% and 0.4%, and at most equal to the greatest modulus of elasticity upon traction of the most extensible working ply, for relative elongations greater than 0.4%, does not make it possible to obtain the best price/quality ratio, since the optimum fatigue strength of the circumferential elements requires a minimum density of the elements at the edges of the ply and a minimum tensile strength of said elements.

SUMMARY OF THE INVENTION

The object of the invention is to improve the endurance of the crown reinforcement of the type of tire in question, without being faced with problems of fatigue of reinforcement elements. In the context of coupling the two working plies radially on either side of the additional ply of reinforcement elements, the solution consisting in selecting said elements as being circumferential has unexpectedly not proved to be the best solution.

The tire according to the invention, with a radial carcass reinforcement of maximum axial width $S_0$, comprising a crown reinforcement formed of at least two working crown plies of inextensible reinforcement elements, crossed from one ply to the other, forming angles of between 10° and 45° with the circumferential direction, said plies having axial widths at least equal to 80% of the width $S_0$, and greater by at least 16% of the width $S_0$ than the width of an additional ply of reinforcement elements, arranged radially between said working plies, said working plies, on either side of the equatorial plane and in the immediate axial extension of the additional ply, being coupled over an axial distance at least equal to 3.5% of the width $S_0$, then being decoupled by profiled members of rubber mix at least over the remainder of the width common to said two working plies, is characterized in that the reinforcement elements of the additional ply are inextensible and substantially radial.

The thickness of the decoupling profiled members between working plies, measured at the ends of the least wide working ply, will be at least equal to two millimeters, and preferably greater than 2.5 mm.

"Coupled plies" is to be understood to mean plies, the respective reinforcement elements of which are separated radially by at most 1.5 mm, said thickness of rubber being measured radially between the upper and lower generatrices, respectively, of said reinforcement elements. "Inextensible element" is to be understood to mean an element, whether cable or monofilament, which has a relative elongation of less than 0.2% when it is subjected to a tensile force equal to 10% of the breaking load. In the case of the tire in question, the inextensible reinforcement elements are preferably inextensible metal cables made of steel.

Substantially radial reinforcement elements, whether wires or cables, are elements which form angles within the range of +85°, −85° around 0° with the circumferential direction.

The working plies generally are of unequal axial widths. The radially outermost working ply may be less wide axially than the radially innermost working ply: it is then advantageous for the crown reinforcement to be finished off radially to the outside by an additional ply, referred to as a protective ply, of so-called elastic reinforcement elements, oriented relative to the circumferential direction at an angle of between 10° and 45° and of the same direction as the angle formed by the inextensible elements of the least wide working ply. Said protective ply may have an axial width less than the axial width of the least wide working ply, but advantageously sufficient totally to cover the zone of coupling between the two working crown plies, and even more advantageously the tread of the tire in question comprises a circumferential or quasi-circumferential groove axially arranged radially on the zone of coupling between the two working plies. Said protective ply may also have an axial width greater than the axial width of the least wide working ply, such that it covers the edges of the least wide working ply and such that it is coupled, in the axial extension of the additional ply, with the widest working crown ply over an axial distance equal to at least 2% of the width $S_0$, then being decoupled, axially to the outside, from said widest working ply by profiled members of a thickness of at least 2 mm. The protective ply formed of elastic reinforcement elements may, in the case referred to above, be firstly possibly decoupled from the edges of said least wide working ply by profiled members of a substantially lesser thickness than the thickness of the profiled members separating the edges of the two working plies, and secondly have an axial width less than or greater than the axial width of the widest crown ply.

Whatever the solution described above, the crown reinforcement may be finished off, radially to the inside between the carcass reinforcement and the radially inner working ply closest to said carcass reinforcement, by a triangulation ply of inextensible reinforcement elements, forming with the circumferential direction an angle greater than 60° and of the same direction as that of the angle formed by the reinforcement elements of the ply radially closest to the carcass reinforcement. Said triangulation ply may have an axial width less than said widest working ply, which, in the crown reinforcement in question, is radially closest to the carcass reinforcement. Said triangulation ply may also have an axial width greater than the width of the widest working ply, and it is then advantageous for the radially outer, so-called protective, ply coupled to the widest working ply, also to be coupled, in the immediate axial extension of the widest working ply, to said triangulation ply over an axial distance of at least 0.02 times the width $S_0$ of the carcass reinforcement, then being decoupled, axially to the outside, from the edges of said triangulation ply by profiled members of a thickness of at least 2 mm. The protective ply formed of elastic reinforcement elements may then be decoupled from the edges of said least wide working ply, as previously, by profiled members of a substantially lesser thickness than the thickness of the profiled members separating the edges of the two working plies. Said protective ply may also be wider or less wide than the triangulation ply.

The radially outermost working ply may be axially wider than the radially innermost working ply: it is then advantageous for the crown reinforcement to be completed, radially on the inside, by a triangulation ply of inextensible reinforcement elements forming with the circumferential direction an angle greater than 60° of the same direction of that of the angle of the reinforcement elements of the least wide ply. The so-called triangulation ply may have an axial width which is less than the axial width of the least wide working ply, that is to say, the ply radially closest to the carcass reinforcement. Preferably, said triangulation ply will have an axial width greater than the width of the least wide working ply and a width such that it is coupled, in the axial extension of the least wide working ply, to the widest working ply over an axial distance of at least 0.02 times the width $S_0$, then being decoupled from the edges of said ply by means of profiled members of rubber mix of a thickness of at least 2 mm, and that it is the triangulation ply or the widest working ply which has the greatest width.

The crown reinforcements which have been described above, with the working ply radially farthest from the carcass reinforcement as being axially the widest, may also be completed, radially to the outside of said widest working ply, by a protective ply of elastic reinforcement elements, oriented at an angle of between 10° and 45° relative to the circumferential direction, of the same direction as that of the angle of the elements of the radially widest working ply. Said protective ply may have an axial width which is less than the width of the least wide working ply, and may completely cover the zone of coupling between the two working crown plies. It may also be wider than the least wide working ply, and less wide than the widest working ply, but will preferably have an axial width such that it radially covers the edges of the widest working ply, possibly being separated from said edges by profiled members of a thickness which may be less than the thickness of the profiled members separating the edges of the least wide working ply from the widest working ply, then, in the axial extension of the least wide working ply, being coupled with the radially inner triangulation ply formed of greatly inclined inextensible elements, over an axial width at least equal to 2% of the width $S_0$, then decoupled from the edges of said triangulation ply by rubber profiled members of a thickness of at least 3 mm, whether it be the triangulation ply or the protective ply which is the widest.

The characteristics and advantages of the invention will be better understood with reference to the following description, which refers to the drawings, illustrating in non-limitative manner examples of embodiments of the invention.

DESCRIPTION OF THE PREFERRED EMBODIMENTS

Figure 1:
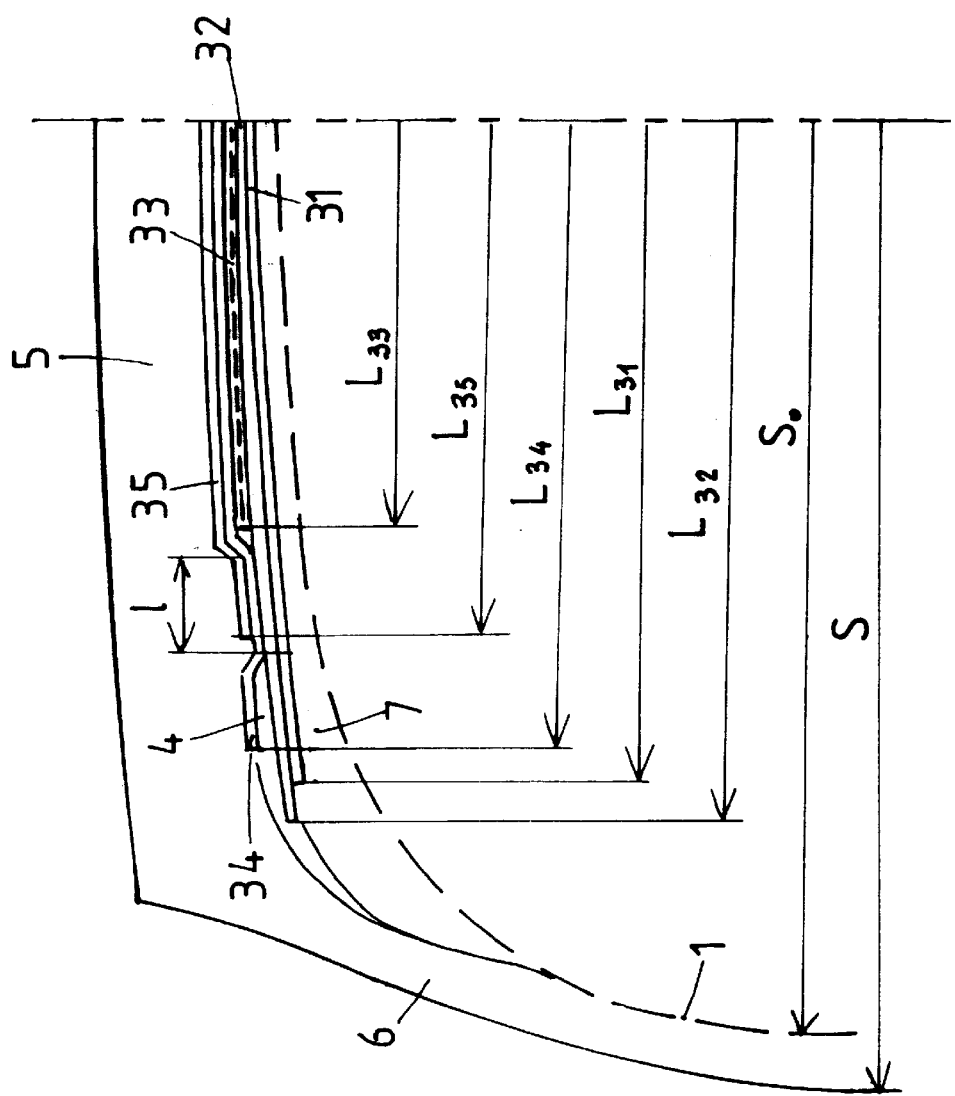
FIG. 1 shows a diagram, viewed in meridian section, of a first preferred variant of a crown reinforcement according to the invention.

In FIG. 1, the tire of dimension 495/45 R 22.5 X, has an H/S form ratio of 0.45, H being the height of the tire on its mounting rim and S its maximum axial width. Said tire comprises a radial carcass reinforcement 1 anchored in each bead to at least one bead wire, forming an upturn, and formed of a single ply of metal cables. This carcass reinforcement 1 is hooped by a crown reinforcement 3, formed radially from the inside to the outside by a first ply 31, referred to as a triangulation ply, formed of inextensible metal cables oriented relative to the circumferential direction by an angle $\delta$ equal to 65°, radially above and covering the preceding so-called triangulation ply, by a first working ply 32 formed of inextensible metal cables oriented by an angle $\alpha$, equal in the case illustrated to 18° and of the same direction as the angle $\delta$ of the elements of the triangulation ply, surmounting the first working ply 32, by an additional ply 33 formed of inextensible metal cables made of steel, said cables being oriented at 90° relative to the circumferential direction, the axially outer edges of said additional ply 33 being separated from the working crown ply 32 by layers of rubber of low thickness, then by a second working ply 34 formed of metal cables identical to those of the first working ply 32, and forming an angle $\beta$, opposed to the angle $\delta$ and, in the case illustrated, equal to said angle $\alpha$ of 18° (but possibly being different from said angle $\alpha$), with the circumferential direction, and finally by a final ply of so-called elastic cables, oriented relative to the circumferential direction by an angle $\gamma$ of the same direction as the angle $\beta$ and equal to said angle $\beta$ (but possibly being different from said angle), this last ply being a protective ply.

The axial width $L_{32}$ of the first working ply 32 is equal to 0.87 times the maximum axial width $S_0$ of the center section of the carcass reinforcement 1, namely 416 mm, which, for a tire of conventional shape, is substantially less than the width of the tread, which is equal in the case in question to 430 mm. The axial width $L_{34}$ of the second working ply 34 is equal to 0.83 times the axial width $S_0$, or 400 mm. The triangulation ply 31 has an axial width $L_{31}$, which is intermediate between the respective widths of the two working plies 32, 34 and in this case equal to 408 mm. As for the axial width $L_{33}$ of the additional ply 33, it is equal to 320 mm. In actual fact, the width $L_{33}$ of the additional ply 33 is less than the width $L_{32}$ ($L_{34}$) of the least wide working ply, while retaining a width sufficient to contribute effectively to the reduction in the operating temperatures of the tire close to the ends of the working crown plies, which are the regions most adversely affected by the heating and the separations between plies. The final crown ply 35, referred to as a protective ply, has a width $L_{35}$ which is substantially equal to 370 mm.

The two working plies 32 and 34, on either side of the equatorial plane and axially in the extension of the additional ply 33, are coupled over an axial width 1, equal in this case to 17 mm: the cables of the first working ply 32 and the cables of the second working ply 34, over the axial width 1 of coupling of the two plies, are separated radially from each other by a layer of rubber, the thickness of which is minimal and which corresponds to twice the thickness of the rubber calendering layer of the hooped 27.23 metal cables of which each working ply 32, 34 is formed, i.e. 0.8 mm. Over the remaining width common to the two working plies, that is to say, about 20 mm on either side, the two working plies 32 and 34 are separated by a rubber profiled member 4 of substantially triangular shape, the thickness of said profiled member 4 increasing from the axial end of the coupling zone to the end of the least wide working ply, reaching a thickness of 4 mm at said end. Said profiled member 4 is of sufficient width to cover radially the end of the widest working ply 32 which, in this case, is the working ply radially closest to the carcass reinforcement. The tire crown is completed by a tread 5 joined to the beads by two sidewalls 6 and the triangulation ply, radially adjacent to the carcass reinforcement 1 on either side of the equatorial plane, moves away therefrom axially towards the outside, said ply being joined to the carcass reinforcement 1 by means of triangular rubber profiled members 7.

Figure 2:
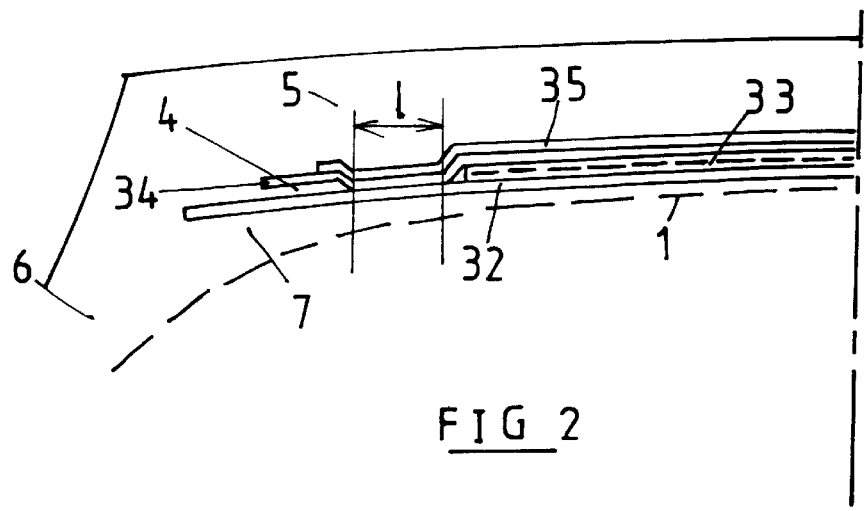
FIG. 2 shows a second preferred variant according to the invention.

The tire of FIG. 2, of dimension 315/80 R 22.5 X, has an H/S form ratio of 0.8, H being the height of the tire on its mounting rim and S its maximum axial width. The architecture of the crown reinforcement 3 of said tire differs from that described previously by the absence of a so-called triangulation ply. Thus the carcass reinforcement 1 anchored in each bead to at least one bead wire, forming an upturn, and formed of a single ply of metal cables, is hooped by a crown reinforcement 3, formed radially from the inside to the outside by a first working crown ply 32 formed of inextensible metal cables made of steel, oriented by an angle $\alpha$, equal in the case illustrated to 18°, radially adjacent and parallel to the carcass reinforcement 1 in its median part, the edges of which are separated from said carcass reinforcement by rubber profiled members 7 of a thickness which increases axially from the inside to the outside, surmounting the first working crown ply 32, by an additional ply 33 formed of inextensible metal cables made of steel, said cables being oriented at 90° relative to the circumferential direction, and the axially outer edges of said additional ply 33 of radial elements being separated from the first working crown ply 32 by layers of rubber of low thickness, then by a second working crown ply 34 formed of metal cables identical to those of the first ply 32, and forming an angle $\beta$, opposed to the angle $\alpha$ and, in the case illustrated, equal to said angle $\alpha$ of 18° (but possibly being different from said angle $\alpha$), with the circumferential direction, and finally by a final ply 35 of so-called elastic metal cables, oriented relative to the circumferential direction by an angle $\gamma$ of the same direction as the angle $\beta$ and equal to said angle $\beta$ (but possibly being different from said angle), this last ply being a protective ply.

The protective ply 35 is surmounted radially by a tread 5 having four main circumferential grooves, the axially outermost grooves being located axially and radially above the zone of coupling of width 1 between the two working crown plies 32 and 34.

The axial width $L_{32}$ of the first working ply 32 is slightly less than the width of the tread, which tread width, in the case in question, is equal to 235 mm. The axial width $L_{34}$ of the second working ply 34 is slightly less than the width $L_{32}$, since it is equal to 210 mm. The axial width $L_{33}$ of the additional ply 33 is equal to 176 mm. The working plies 32 and 34, on either side and on both sides of the equatorial plane, in the extension of the additional ply 33, are coupled over a distance 1 of 9 mm, which represents a little less than 0.03 times the maximum axial width of the carcass reinforcement 1, with the same definition of coupling as in the previous case: minimal thickness between the cables of the plies and equal in the present case to 1 mm. Over the remaining width common to the two working plies, that is to say, about 6 mm on either side, the two working plies 32 and 34 are separated by a triangular rubber profiled member 4 having a thickness of 3.5 mm, measured at the end of the least wide working ply 34, the thickness of said profiled member increasing from the axial end of the coupling zone to the end of the least wide working ply. The crown reinforcement thus described is completed by a final ply 35 of so-called elastic steel cables, oriented relative to the circumferential direction by an angle γ of the same direction as the angle β, and equal to said angle β (but possibly being different therefrom), this latter ply 35 being a so-called protective ply, and elastic cables, as in the first example described, being cables having a relative elongation of at least 4% upon rupture. The axial width $L_{35}$ of said ply 35 is substantially equal to 198 mm, so as to cover the coupling zones between the two working plies 32 and 34.

Figure 3:
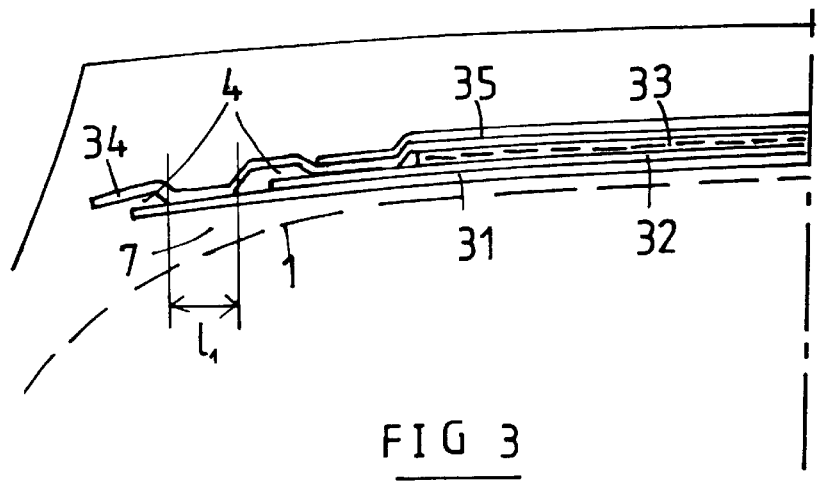
FIG. 3 shows a third variant in the same manner.

The examples described and illustrated in FIGS. 1 and 2 relate to a single zone of coupling between plies. The tire shown in FIG. 3, of the same dimensions as those of the tire described in the first example, relates to two zones of coupling between plies. The architecture of the crown reinforcement 3 of said tire differs from that of the tire of FIG. 1:

firstly by the inversion of the axial widths of the two working plies 32 and 34, secondly by the modification of the widths of plies, working plies 32 and 34 and triangulation ply 31, the additional ply 33 retaining the same width of 320 mm, the width $L_{32}$ of the radially inner working ply 32 becoming equal to 380 mm, the width $L_{34}$ of the radially outer working ply 34 becoming equal to 451 mm, such that the triangulation ply 31 of width $L_3$, equal to 431 mm is coupled, on either side of the equatorial plane, to the second working ply 34 in the axial extension of the first working ply 32, over a width $1_2$ substantially equal to 10 mm, the edges of said triangulation ply 31 then being decoupled from the widest working ply 34 by profiled members 4 of a width of 3.5 mm. Said preferred variant makes it possible, in particular, to improve the resistance to separation between the edges of working plies at the least wide ply 32.

I claim:

1. A tire with a radial carcass reinforcement of maximum axial width $S_0$, the tire comprising a crown reinforcement formed of at least two working crown plies of inextensible reinforcement elements, crossed from one ply to the other, forming angles of between 10° and 45° with the circumferential direction, said plies having axial widths at least equal to 80% of the width $S_0$, and greater by at least 16% of the width $S_0$ than the width of an additional ply of reinforcement elements, arranged radially between said working plies, said working plies being, on either side of the equatorial plane and in the immediate axial extension of the additional ply, coupled over an axial distance at least equal to 3.5% of the width $S_0$, then being decoupled by profiled members of rubber mix at least over the remainder of the width common to said two working plies, the tire characterized in that the reinforcement elements of the additional ply are metallic, inextensible and substantially radial.

2. A tire according to claim 1, characterized in that the profiled members have a thickness of at least 2 mm at the ends of the least wide working ply.

3. A tire according to claim 2, characterized in that the crown reinforcement, the working plies of which are of unequal axial widths, the radially outer working ply being less wide axially than the radially inner working ply, also comprises, radially to the outside, a protective ply of elastic reinforcement elements, oriented relative to the circumferential direction at an angle of between 10° and 45° and of the same direction as the angle formed by the inextensible elements of the least wide working ply, said protective ply having an axial width less than the axial width of the least wide working ply.

4. A tire according to claim 2, characterized in that the crown reinforcement, the working plies of which are of unequal axial widths, the radially outer working ply being less wide axially than the radially inner working ply, also comprises, radially to the outside, a protective ply of elastic reinforcement elements, oriented relative to the circumferential direction at an angle of between 10° and 45° and of the same direction as the angle formed by the inextensible elements of the least wide working ply, said ply having an axial width such that it radially covers the edges of the least wide working ply and such that it is then coupled, in the axial extension of the additional ply, with the widest working crown ply over an axial distance of at least 2% of the width $S_0$, then being separated, axially to the outside, from said widest working ply by rubber profiled members of a thickness of at least 2 mm at the ends of the widest working ply.

5. A tire according to claim 4, characterized in that the protective ply formed of elastic reinforcement elements is decoupled from the edges of said least wide working ply by rubber profiled members of a substantially lesser thickness than the thickness of the rubber profiled members separating the edges of the two working plies.

6. A tire according to claim 5, characterized in that the crown reinforcement furthermore comprises, radially to the inside, between the carcass reinforcement and the radially inner working ply closest to said carcass reinforcement, a triangulation ply of inextensible reinforcement elements forming with the circumferential direction an angle greater than 60°, of the same direction as the angle of the reinforcement elements of the working ply, and of axial width greater than the width of the widest working ply, the protective ply coupled to the widest working ply, the protective ply having a width such that it is also coupled, in the immediate axial extension of the widest working ply, to said triangulation ply over an axial distance of at least 0.02 times the width $S_0$ of the carcass reinforcement, then being decoupled, axially to the outside, from the edges of said triangulation ply by rubber profiled members of a thickness of at least 2 mm.

7. A tire according to claim 2, characterized in that the crown reinforcement, the working plies of which are of unequal axial widths, the radially outermost working ply being wider axially than the radially innermost working ply, also comprises, radially to the inside, a triangulation ply of inextensible reinforcement elements, forming with the circumferential direction an angle greater than 60°, of the same direction as the angle of the reinforcement elements of the least wide working ply, and the axial width of which is less than the width of the least wide working ply.

8. A tire according to claim 7, characterized in that the crown reinforcement comprises, radially to the outside of the widest working ply, a protective ply of elastic reinforcement elements, oriented relative to the circumferential direction at an angle of between 10° and 45° and of the same direction as the angle formed by the inextensible elements of the widest working ply.

9. A tire according to claim 7, characterized in that the crown reinforcement comprises, radially to the outside of the widest working ply, a protective ply of elastic reinforcement elements, oriented at an angle of between 10° and 45° relative to the circumferential direction, of the same direction as that of the angle formed by the inextensible elements of the widest working ply, said protective ply having an axial width such that it radially covers the ends of the widest working ply and that, in the immediate extension of the least wide working ply, it is coupled with the radially inner triangulation ply, over an axial width at least equal to 2% of the width $S_0$, then decoupled from the edges of said triangulation ply by rubber profiled members of a thickness of at least 3 mm.

10. A tire according to claim 2, characterized in that the crown reinforcement, the working plies of which are of unequal axial widths, the radially outermost working ply being wider axially than the radially innermost working ply, also comprises, radially to the inside, a triangulation ply of inextensible reinforcement elements forming with the circumferential direction an angle greater than 60° and of the same direction as the angle of the reinforcement elements of the least wide working ply, and of a width greater than the width of the least wide working ply, the widest working ply being coupled, in the immediate extension of the least wide working ply, with the triangulation ply over an axial distance of at least 0.02 times the width $S_0$ of the carcass reinforcement, then being decoupled from the edges of said triangulation ply by profiled members of rubber mix of a thickness of at least 2 mm.

11. A tire according to claim 10, characterized in that the crown reinforcement comprises, radially to the outside of the widest working ply, a protective ply of elastic reinforcement elements, oriented relative to the circumferential direction at an angle of between 10° and 45° and of the same direction as the angle formed by the inextensible elements of the widest working ply.

12. A tire according to claim 10, characterized in that the crown reinforcement comprises, radially to the outside of the widest working ply, a protective ply of elastic reinforcement elements, oriented at an angle of between 10° and 45° relative to the circumferential direction, of the same direction as that of the angle formed by the inextensible elements of the widest working ply, said protective ply having an axial width such that it radially covers the ends of the widest working ply and that, in the immediate extension of the least wide working ply, it is coupled with the radially inner triangulation ply, over an axial width at least equal to 2% of the width $S_0$, then decoupled from the edges of said triangulation ply by rubber profiled members of a thickness of at least 3 mm.

13. A tire according to claim 1, characterized in that the crown reinforcement furthermore comprises, radially to the inside, between the carcass reinforcement and the radially inner working ply closest to said carcass reinforcement, a triangulation ply of inextensible reinforcement elements, forming with the circumferential direction an angle greater than 60° of the same direction as that of the angle of the reinforcement elements of the working ply, and of axial width less than the axial width of the widest working ply.

\* \* \* \* \*

UNITED STATES PATENT AND TRADEMARK OFFICE
CERTIFICATE OF CORRECTION

PATENT NO.   : 6,470,939 B1
DATED        : October 29, 2002
INVENTOR(S)  : Cluzel, Guy It is certified that error appears in the above-identified patent and that said Letters Patent is hereby corrected as shown below:

<u>Title page,</u>
Item [73], Assignee, "Campagnie" should read -- Compagnie --; and "Clarmont-Ferrand" should read -- Clermont-Ferrand --

<u>Column 5,</u>
Line 45, "δ" should read -- α --.

<u>Column 6,</u>
Lines 9 and 11, "1" (one (boldface)) should read -- l -- (lowercase "L" (no bold))
Line 42, "by" should read -- ¶by --

<u>Column 7,</u>
Line 4, "1" (one (boldface)) should read -- l -- (lowercase "L" (no bold))
Line 16, "1" (one) should read -- l -- (lowercase "L")
Line 55, "1$_2$" (one sub 2 (boldface)) should read -- l$_2$ -- (lowercase "L" sub 2 (no bold))

Signed and Sealed this

Sixteenth Day of September, 2003

JAMES E. ROGAN
*Director of the United States Patent and Trademark Office*